(12) United States Patent
Petersen

(10) Patent No.: US 10,286,579 B2
(45) Date of Patent: May 14, 2019

(54) MOULDING ARTICLES

(75) Inventor: Leif Kappel Petersen, Lem St (DK)

(73) Assignee: Vestas Wind Systems A/S, Aarhus N. (DK)

(*) Notice: Subject to any disclaimer, the term of this patent is extended or adjusted under 35 U.S.C. 154(b) by 1250 days.

(21) Appl. No.: 14/237,766

(22) PCT Filed: Aug. 1, 2012

(86) PCT No.: PCT/DK2012/050283
§ 371 (c)(1),
(2), (4) Date: Dec. 1, 2014

(87) PCT Pub. No.: WO2013/020558
PCT Pub. Date: Feb. 14, 2013

(65) Prior Publication Data
US 2015/0076738 A1    Mar. 19, 2015

Related U.S. Application Data

(60) Provisional application No. 61/521,372, filed on Aug. 8, 2011.

(30) Foreign Application Priority Data

Aug. 8, 2011 (DK) .................................. 2011 70436

(51) Int. Cl.
| | |
|---|---|
| *B29C 35/04* | (2006.01) |
| *B29C 33/04* | (2006.01) |
| *B29L 31/08* | (2006.01) |

(52) U.S. Cl.
CPC ............ *B29C 35/04* (2013.01); *B29C 33/046* (2013.01); *B29C 35/045* (2013.01);
(Continued)

(58) Field of Classification Search
CPC ........................................................ B29C 35/04
See application file for complete search history.

(56) References Cited

U.S. PATENT DOCUMENTS

| | | | | |
|---|---|---|---|---|
| 3,259,175 A | * | 7/1966 | Kraus | ................... B29C 35/007 165/267 |
| 2002/0162940 A1 | * | 11/2002 | Frul | ....................... H02K 1/278 248/683 |

FOREIGN PATENT DOCUMENTS

| | | |
|---|---|---|
| DE | 102008022699 A1 | 11/2009 |
| EP | 1316400 A1 | 6/2003 |

(Continued)

OTHER PUBLICATIONS

International Searching Authority, Search Report and Written Opinion issued in corresponding International Application No. PCT/DK2012/050283 dated Oct. 25, 2012, 8 pages.

(Continued)

*Primary Examiner* — Larry W Thrower

(57) ABSTRACT

A mold for forming a wind turbine blade is formed in two halves, each half 1a comprising a sandwich structure of a perforated outer layer, an inner aluminum honeycomb structure and an inner impermeable heat-conducting layer. An article in the form of a mat of glass fiber impregnated with epoxy resin is placed in the mold. A supply chamber 6 supplies heated pressurized air to the mold which passes into the honeycomb core of the mold through the perforated outer layer, and back through the outer layer into two exhaust chambers 7. A row of supply conduits 13 and exhaust conduits 16 connect the exhaust chambers 7 to the supply chamber 6. The air in each conduit 13, 16 is heated by a respective heat exchanger 18 supplied with heated water 9. The heated air cures the epoxy resin, and the mold is then cooled by supplying cold water to the heat exchangers 18, which, in turn cools the air supplied to the mold. The (Continued)

water used to cool the mold is then re-used for the subsequent heating of another article placed in the mold, in order to save energy. Alternatively, the article in the mold may be cooled using a separate supply of air which is not cooled in the heat exchangers 18.

20 Claims, 8 Drawing Sheets

(52) U.S. Cl.
CPC ... *B29C 2035/046* (2013.01); *B29L 2031/085* (2013.01); *Y02P 70/523* (2015.11)

(56) References Cited

FOREIGN PATENT DOCUMENTS

| | | |
|---|---|---|
| GB | 965945 | 8/1964 |
| WO | 9825746 A1 | 6/1998 |

OTHER PUBLICATIONS

Danish Patent Office, Combined Search and Examination Report issued in corresponding DK Application No. PA 2011 70436 dated Mar. 21, 2012, 6 pages.

\* cited by examiner

MOULDING ARTICLES

The present invention relates to methods and apparatus for moulding articles, and more particularly to arrangements for moulding outer shells for wind turbine blades.

An outer shell of a wind turbine blade is typically manufactured by moulding into a desired shape a mat of glass fibre, or other suitable fibre, impregnated with epoxy resin. The mat is placed in a mould which is then heated to cure the epoxy resin. When the epoxy resin is cured, the mould is then cooled, and the finished shells are assembled and then removed from the mould.

Several different methods of controlling the temperature of such a mould are known. For example, the mould may be formed with a channel through which water or other liquid is caused to flow. In this case, the water is typically heated outside the mould, for example using an electrical immersion heater.

However, such an arrangement gives rise to a number of disadvantages. The temperature required to cure the epoxy resin within a commercially acceptable time can exceed 100° C., in which case the water must be supplied to the mould at high pressure, which can cause health & safety hazards. In addition, heated water is corrosive, and so can damage the mould.

In order to control the temperature of the entire volume of the mould, a serpentine channel may be formed in the mould, so as to optimise the area of contact between the water and the mould.

However, the formation of a serpentine channel in a mould is a complex, time consuming, and expensive operation. Furthermore, with large moulds, the resulting length of the serpentine channel gives rise to an undesirably large temperature gradient along the length of the channel, which results in uneven curing of the epoxy resin.

It would therefore be desirable to provide an arrangement which overcomes, or at least mitigates, one or more of the above disadvantages.

Thus, in accordance with a first aspect of the present invention there is provided apparatus for moulding an article, the apparatus comprising: a mould having a structure which permits the flow of gas therethrough; the apparatus being arranged to supply gas to the mould at a plurality of supply ports and to cause the gas to flow through the mould so as to control the temperature of the article in the mould, and to be exhausted from the mould at a plurality of exhaust ports; the apparatus further comprising: a plurality of heat exchangers located externally to the mould, each heat exchanger being arranged to transfer heat between the gas flowing from at least one of the exhaust ports to at least one of the supply ports and a supply of liquid.

In the preferred embodiments, each heat exchanger is connected between different respective supply and exhaust ports.

By using gas to control the temperature of the mould, any desired temperature can be achieved without health and safety hazards associated with pressurised water heating. Furthermore, by supplying the gas to the mould in the form of a number of separate streams, the temperature of each stream of gas being controlled by a heat exchanger, the temperature gradients across the mould can thereby be minimised so as to provide uniform heating and cooling of the mould.

Furthermore, such an arrangement enables the temperature to be controlled locally at different regions within the mould, so as to compensate for differences in heat loss at the different regions, or alternatively to create a desired temperature profile within the mould.

The use of heat exchangers is advantageous in that this enables high power levels to be transferred to the mould which permits rapid heating and/or cooling of the article in the mould.

The use of liquid in the heat exchangers provides an effective means of saving energy, since heat transferred from the mould to the liquid during the cooling stage of one article can be transferred from the liquid back to the mould during the curing stage of another article. In this case, the heat energy supplied to the liquid is less than would be required if a fresh source of liquid were used. However, a fresh supply of liquid is preferably used at the start of each cooling process.

In a preferred embodiment, the apparatus further comprises: at least one supply chamber for supplying gas to a first region of the surface of the mould and defining the plurality of supply ports; and at least one exhaust chamber for exhausting gas from second, different region of surface of the mould and defining the plurality of exhaust ports.

In this case, the apparatus preferably further comprises: a plurality of supply conduits external to the mould, each connected between a respective supply port and the associate heat exchanger; and a plurality of exhaust conduits external to the mould, each connected between a respective exhaust port and the associated heat exchanger.

The provision of such supply and exhaust chambers provides a convenient way of distributing the gas from the supply ports to the mould.

Each of the first and second regions of the surface of the mould is preferably a continuous region, since this provides a uniform distribution of the gas within the mould.

In the preferred embodiments of the present invention, the mould is elongate, and the at least one supply chamber and the at least one exhaust chamber extend along substantially the full length of the mould, the apparatus further comprising: at least one additional elongate supply chamber for supplying gas to a third, different region of the surface of the mould which extends along only part of the length of the mould, the or each additional supply chamber defining a plurality of additional supply ports; and at least one additional elongate exhaust chamber for exhausting gas from a fourth, different region of the surface of the mould which extends along only part of the length of the mould, the or each additional exhaust chamber defining a plurality of additional exhaust ports.

In this case, the apparatus preferably further comprises: a plurality of additional supply conduits external to the mould, each connected between a respective additional supply port and a heat exchanger; and a plurality of additional exhaust conduits external to the mould, each connected between a respective additional exhaust port and a heat exchanger.

Such an arrangement enables moulds with non-uniform profiles to be heated and cooled uniformly, since the regions of the mould having a relatively large width can be provided with a greater number of supply and exhaust ports than those regions with a relatively small width, so as to minimise the temperature gradients between the supply ports and the exhaust ports and also to equalise the path lengths of the air within the mould.

In this case, the heat exchangers are preferably distributed longitudinally along the apparatus, since this enables the length of the supply and exhaust conduits to be minimised.

The above arrangements are particularly beneficial when the mould has a generally tapered configuration, with one relatively large end tapers to a relatively small end, in which case the at least one additional supply chamber and the at least one additional exhaust chamber extend along the part of the length of the mould from the relatively large end.

In the preferred embodiment, the mould has a sandwich structure comprising an outer layer in which are formed perforations extending along the said regions of the surface of the mould, an internal honeycomb core of aluminium and a substantially impermeable inner layer, which is preferably made of a material with good thermal conductivity, so as to permit effective heat transfer between the mould and the article. The perforations in the outer layer enable gas to be transported to and from the honeycomb core, and the honeycomb core is transmissive to gas, thereby enabling the gas to pass readily within the mould between the supply ports and the exhaust ports. The substantially impermeable inner layer serves to transfer heat between the mould and the article, but to prevent the gas from impinging on the article in the mould.

The internal honeycomb core of the mould is preferably continuous so as to permit the gas to pass freely throughout the entire mould. Thus, in the event of one of the heat exchangers becoming inoperative during the curing process, the remaining heat exchangers can then be used.

In an alternative arrangement, walls or baffles may be provided so as to separate regions within the honeycomb core, each section being associated with a respective heat exchanger. The walls or baffles can be made airtight, or only partially airtight so as to permit some communication for control purposes.

The apparatus preferably further comprises a structure for supporting the mould, the supply chamber(s), the exhaust chamber(s), the conduits and the heat exchangers. In this way, the apparatus can readily be transported, and the footprint on the factory floor can be minimised, since all of the apparatus can be combined into a single unit.

In the preferred embodiments of the present invention, the mould is formed in a first and second parts, each of which is shaped to form a respective half of the article.

In this case, gas exhausted from the first part of the mould may be supplied to the second part of the mould, at least one of the heat exchangers being arranged to transfer heat between the gas flowing from the first part of the mould to the second part of the mould and a supply of liquid. In this way, some or all of the heat exchangers may be shared between the two parts of the mould.

An alternative way in which heat exchangers may be shared between moulds is for a single heat exchanger to be arranged to transfer heat between the gas flowing from one or more exhaust ports of both the first and second parts of the mould to one or more supply ports of both the first and second parts of the mould and a supply of liquid.

The apparatus advantageously further comprises at least one additional, electric heat exchanger for providing additional control of the temperature of the gas. In this case, the or each electric heat exchanger is preferably arranged between a respective liquid-based heat exchangers and a supply port of the mould, so as to adjust the temperature of the gas after passing through the liquid-based heat exchanger. In the preferred embodiment, each liquid-based heat exchanger is supplemented with a respective electric-powered heat exchanger.

In accordance with a further aspect of the present invention there is provided a method of moulding an article, the method comprising: providing a mould having a structure which permits the flow of gas therethrough; placing the article in the mould; causing gas to flow through the mould so as to control the temperature of the article in the mould; supplying the gas to the mould at a plurality of supply ports; exhausting the gas from the mould at a plurality of exhaust ports; and providing a plurality of heat exchangers external to the mould, and using each heat exchanger to transfer heat between the gas flowing from at least one of the exhaust ports to at least one of the supply ports and a supply of liquid.

The mould is first heated, so as to cure the epoxy resin in the article, and subsequently cooled prior to removal of the article from the mould. The same supply of liquid is preferably used for the cooling of one article in the mould and for the subsequent heating of the mould during the curing of another article, so that the heat energy removed from the first article can be used to heat the second article, thereby saving energy.

Alternatively, a fresh supply of gas can be used to cool the article in the mould, without passing through a heat exchanger. With such an arrangement, there is no need to discard the supply of heated liquid after the article in the mould has been cured, since it can be re-used for the curing of another article.

The gas advantageously comprises air, and the liquid preferably comprises water. Both air and water are cheap and readily available, and air is non-corrosive. As an alternative to water, oil may be used, since this permits higher temperatures necessary for some resins to cure.

The present invention finds particular application in the moulding of wind turbine blades, and particularly the outer shells for such blades. The latest generations of wind turbine blades are of an increasing size, and there is therefore an increasing demand for suitable arrangements for the effective moulding of such large blades. The low thermal gradients which arise from embodiments of the present invention enable such blades to be moulded efficiently and in a timescale which is commercially acceptable.

Preferred embodiments of the present invention will now be described with reference to the accompanying drawings in which.

Figure 7A:
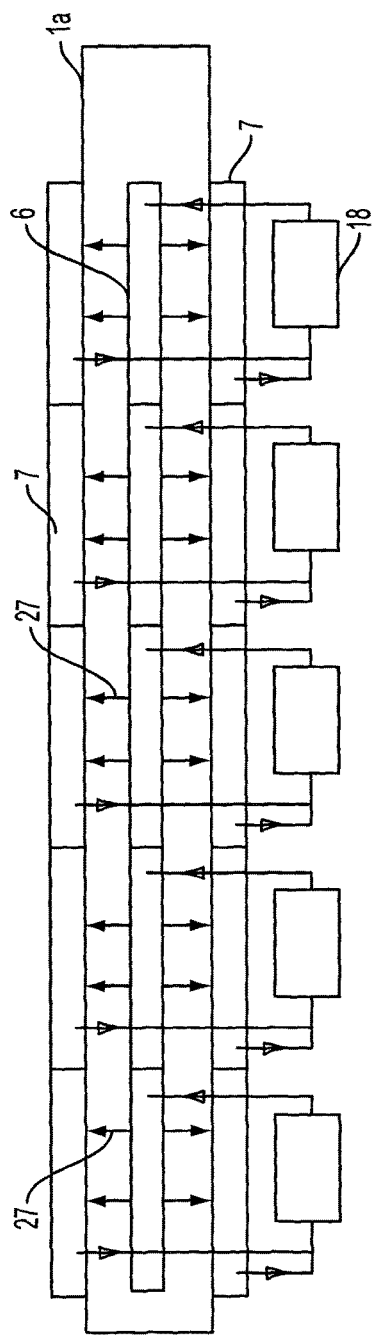
Figure 7B:
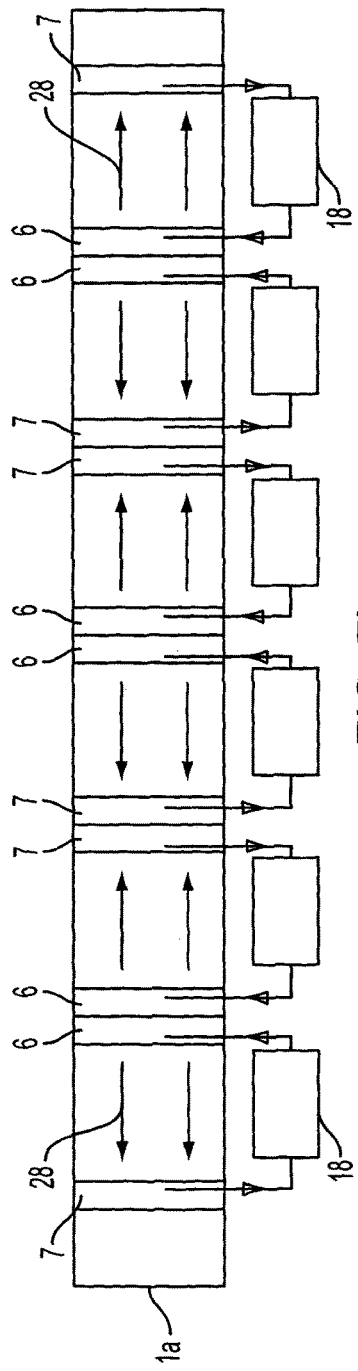
Figure 8:
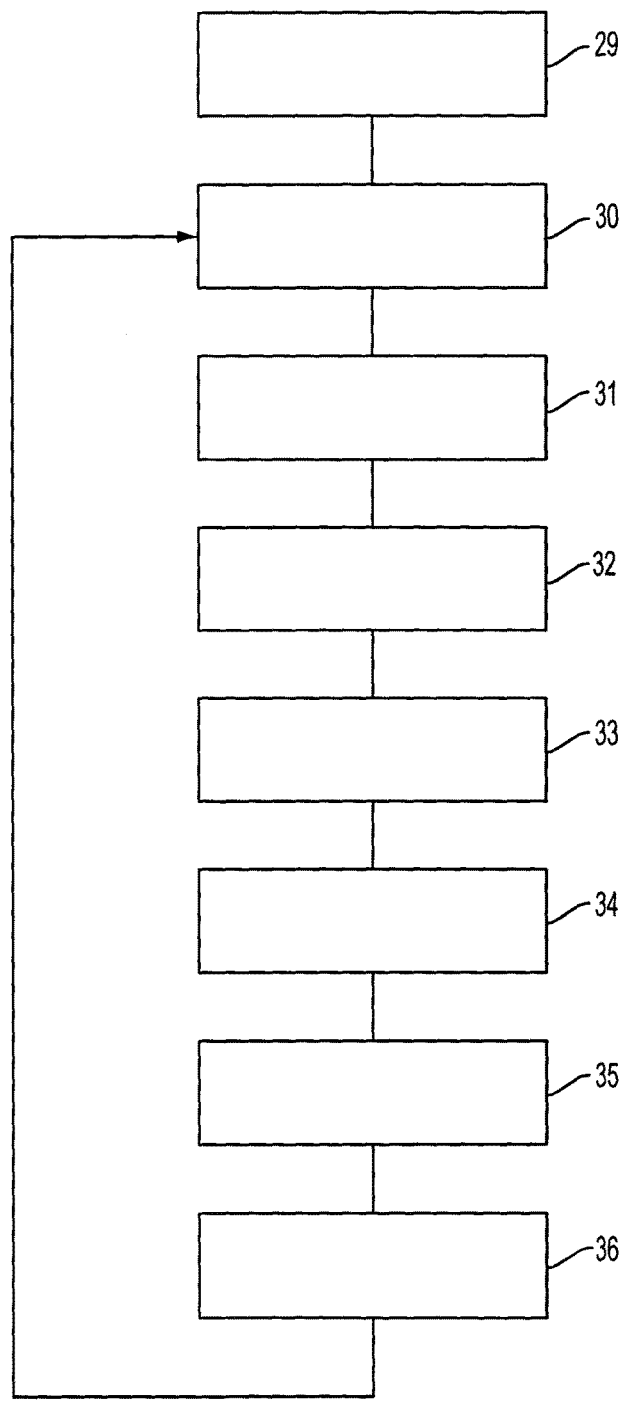

FIGS. 7(a) and 7(b) illustrate schematically two different configurations of the supply and exhaust chambers, each in accordance with preferred embodiments of the present invention; and FIG. 8 is a flowchart illustrating a preferred method of the present invention.

Similar reference numerals appearing in the drawings refer to the same, or corresponding elements.

Figure 1:
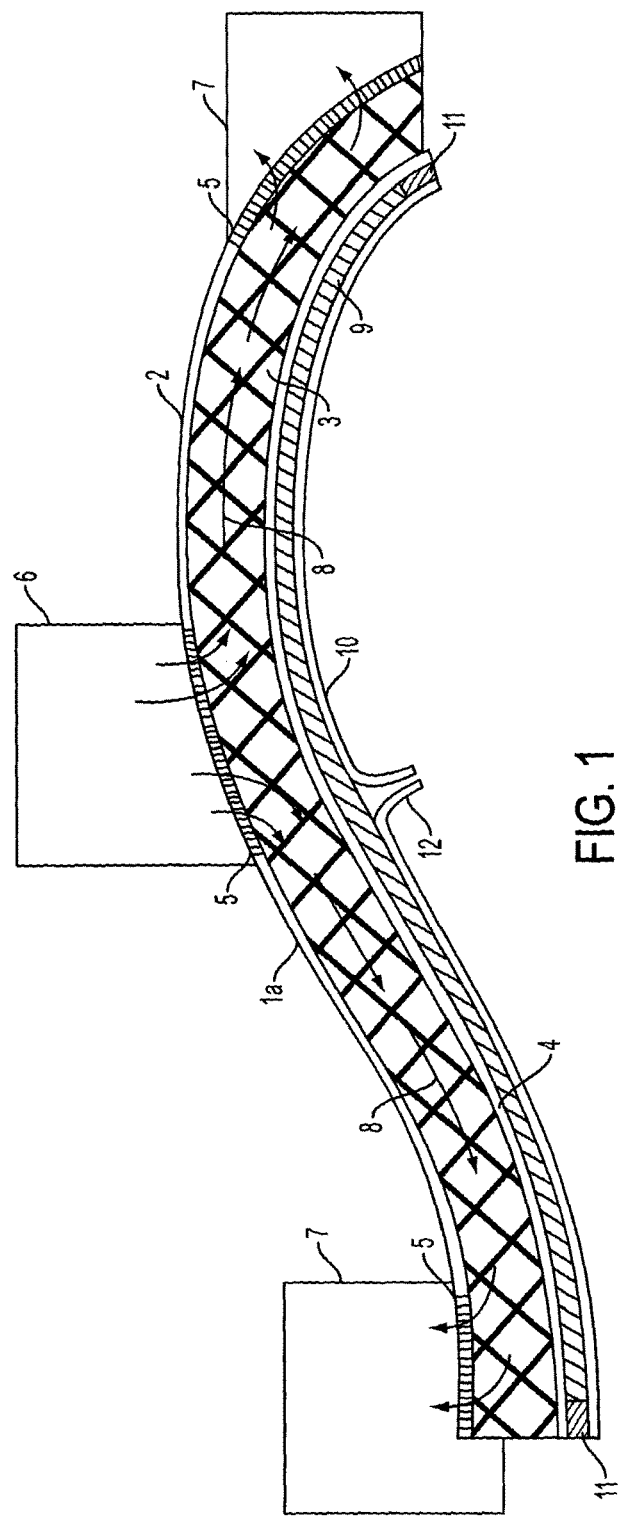
FIG. 1 is a schematic lateral cross-sectional view of the upper half of a moulding apparatus for a wind turbine blade in accordance with a first embodiment of the present invention.

Referring to FIG. 1, the upper half of a moulding apparatus for a wind turbine blade comprises a half-mould 1a formed from a sandwich construction of an outer skin 2, a honeycomb core 3 and an inner skin 4. A corresponding lower half-mould 1b (not shown) has the same structure.

The outer skin 2 is formed with three substantially parallel longitudinal bands of perforations 5 extending along substantially the full length of the half-mould 1a which enable air to pass through the outer skin 2. The honeycomb core 3 comprises aluminium in which are formed perforations, pores or capillaries which permit the passage of air. The inner skin 4 is impermeable to air and made from a heat-conductive material.

An elongate pressure chamber 6 is attached to the central region of the half-mould 1 and extends substantially the full length of the half-mould 1a so as to cover and form a seal over the central longitudinal band of perforations 5 formed in the outer layer 2. The pressure chamber 6 supplies pressurised air to the half-mould 1a. The air passes through the central band of perforations 5 in the outer skin 2 and into the honeycomb core 3.

Two corresponding elongate exhaust chambers 7 are attached to the respective ends of the half-mould 1a and also extend along the full length of the half-mould 1a so as to cover the corresponding two side longitudinal bands of perforations 5 formed in the outer layer 2. The exhaust chambers 7 remove the air which has passed through the honeycomb core 3 and out of the side bands of perforations 5. The direction of the flow of air within the half-mould 1a is illustrated by arrows 8.

The material used to form the wind turbine blade is formed by winding a length of glass fibre, carbon fibre or other suitable fibrous material into two mats 9, each of which will form a respective half of the finished article. The fibre is impregnated with epoxy resin. Each mat 9 is placed on the surface of the inner layer 4 of the respective upper and lower half-moulds 1a, 1b.

The mat 9 which is placed on the upper half-mould 1a is retained on the surface of the half-mould 1a by a vacuum arrangement comprising a flexible cover 10 provided on the surface of the mat 9 and attached to the underlying inner skin 4 of the half-mould 1a at each end thereof by a layer of adhesive 11. The flexible cover 10 is provided with an evacuation port 12 through which the space between the flexible cover 10 and the inner skin 4 of the mould-half 1a is evacuated so as to force the mat 9 into direct contact with the inner skin 4 of the mould 1a. The upper half-mould 1a is then pivoted into its operational position above the lower half-mould 1b so as to form the complete mould 1.

Figure 2:
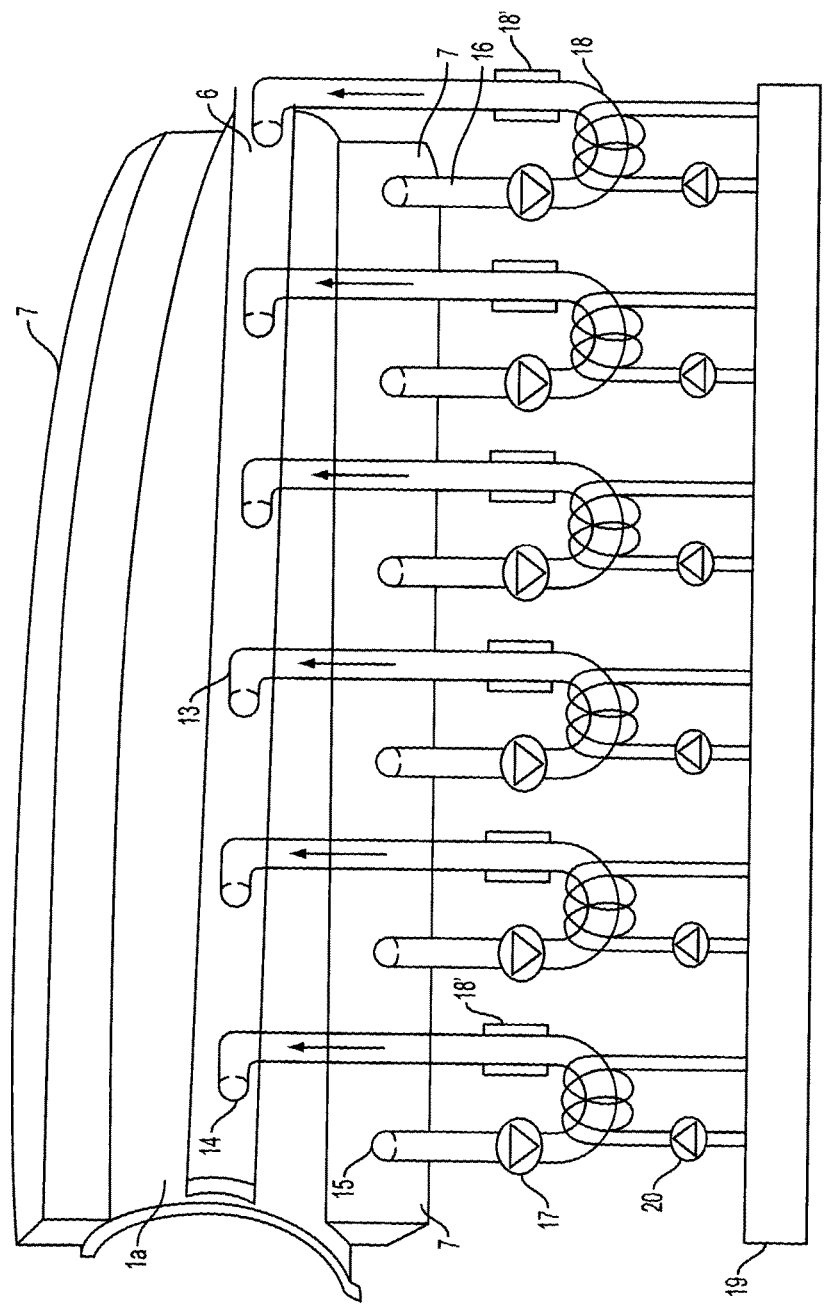
FIG. 2 is a schematic side view of the upper half of the moulding apparatus shown in FIG. 1.

FIG. 2 is a schematic side view of the upper half-mould 1a shown in FIG. 1 and illustrates additional components of the apparatus. The lower half-mould 1b comprises corresponding additional components.

Hot pressurised air is supplied via six supply conduits 13 to corresponding supply ports 14 which are longitudinally spaced along the length of the pressure chamber 6 of the mould 1 and flows within the honeycomb structure 3 of the mould 1. The air is then expelled from the mould 1 into the exhaust chambers 7 and removed from the mould 1 at six exhaust ports 15 through the corresponding exhaust conduits 16.

Each supply conduit 13 and exhaust conduit 16 connects the respective supply port 14 and exhaust port 15 to a respective pump 17, water-based heat exchanger 18 and electric-powered supplementary heat exchanger 18'. Each heat exchanger 18 is connected to a supply of heated water 19, and the water is used to heat the air flowing through the mould 1. Each heat exchanger 18 is provided with a respective pump 20 for pumping water from the water supply 10.

The supplementary heat exchangers 18' serve to provide additional control of the temperature of the air. The passage of pressurised hot air through the mould 1 heats the article for a sufficient time to cure the epoxy resin in the turbine blade.

Following the curing stage, a fresh supply of cold water is supplied to the heat exchangers 18, so as to cool the air flowing through the mould 1 and thereby cool the turbine blade. After cooling, the mould 1 is opened and the finished blade removed. A fresh mat is then placed in the mould 1 and the process repeated.

However, at this stage, the water which has been previously used to cool the mould 1 can be re-used to heat the mould 1 during the subsequent curing stage by supplying heat energy to the water, for example using an electrically powered immersion heater. It will be appreciated that the water acting as a coolant will have become heated in the process of removing heat from the mould 1, and this water can then be further heated to the desired temperature for use in curing a further turbine blade shell. By re-using the partially heated water in this way, it is not necessary to heat a fresh supply of water from room temperature to the operating temperature, thereby saving energy.

Figure 3:
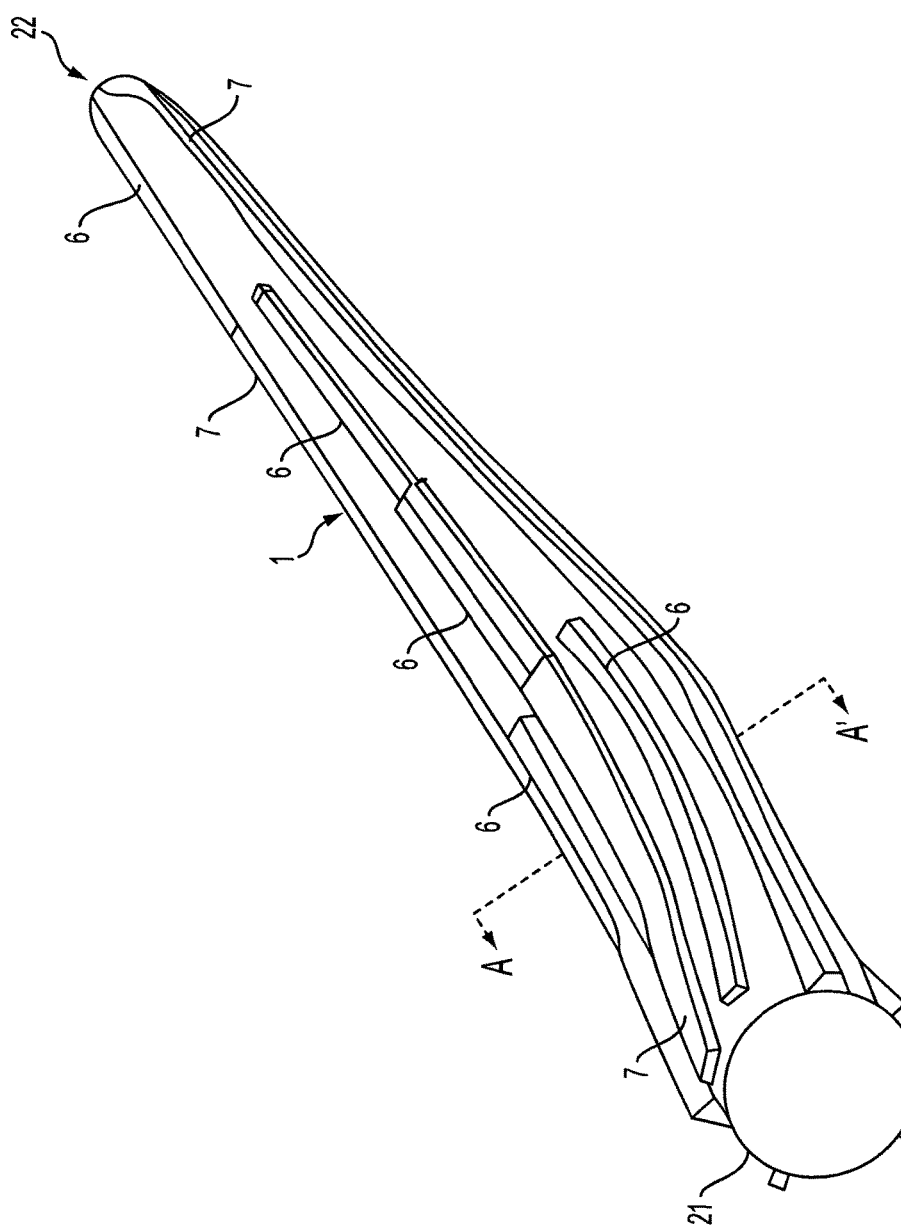
FIG. 3 is a side view of a moulding apparatus for a wind turbine blade in accordance with a second embodiment of the present invention.

FIG. 3 illustrates a second embodiment of a mould, in which the turbine blade shell is tapered. In this case, different numbers of supply chambers 6 and exhaust chambers 7 are provided along the length of the mould 1. This arrangement serves at least partially to equalise the path lengths of the pressurised air passing into the mould at different positions along the length of the mould, since a greater number of chambers 6, 7, are supplied at the large end 21 of the mould 1 than at the small end 22 of the mould 1.

Figure 4:
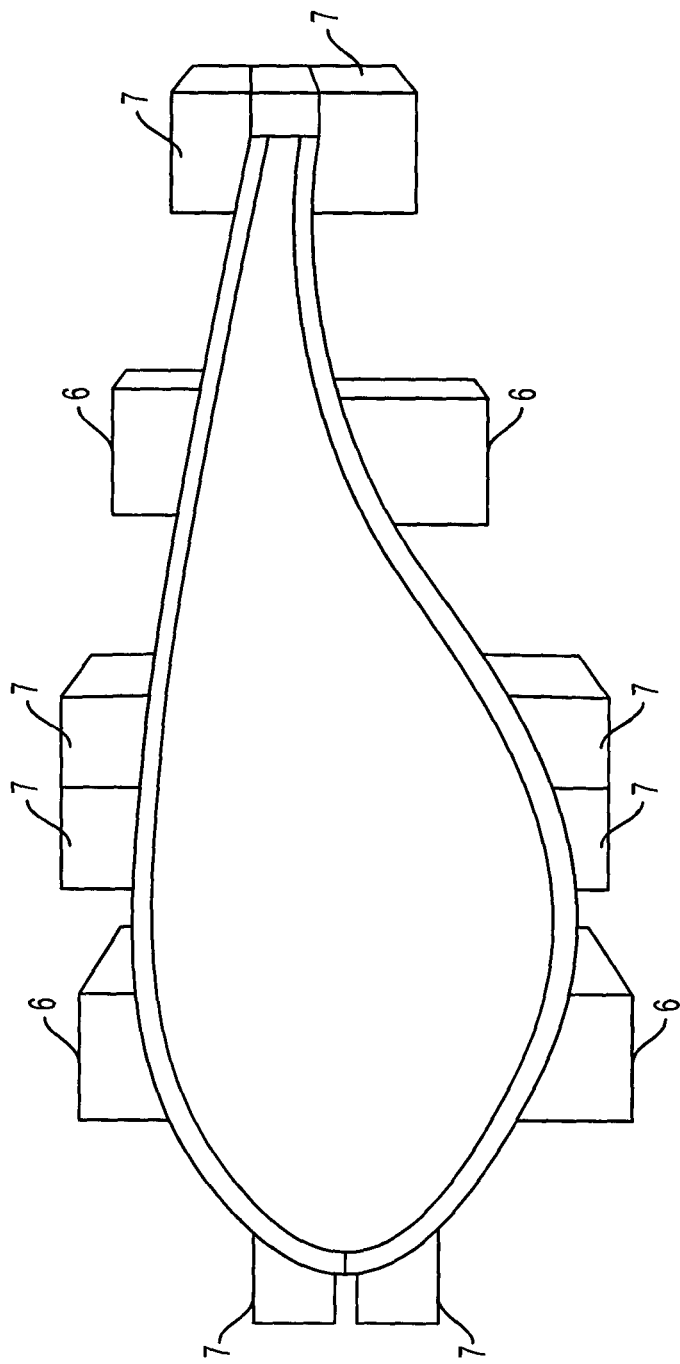
FIG. 4 is a cross-sectional view of the moulding apparatus shown in FIG. 3 taken along the line A-A'.

FIG. 4 is a cross-sectional view of the arrangement shown in FIG. 3 taken along the line A-A' of FIG. 3.

Figure 5:
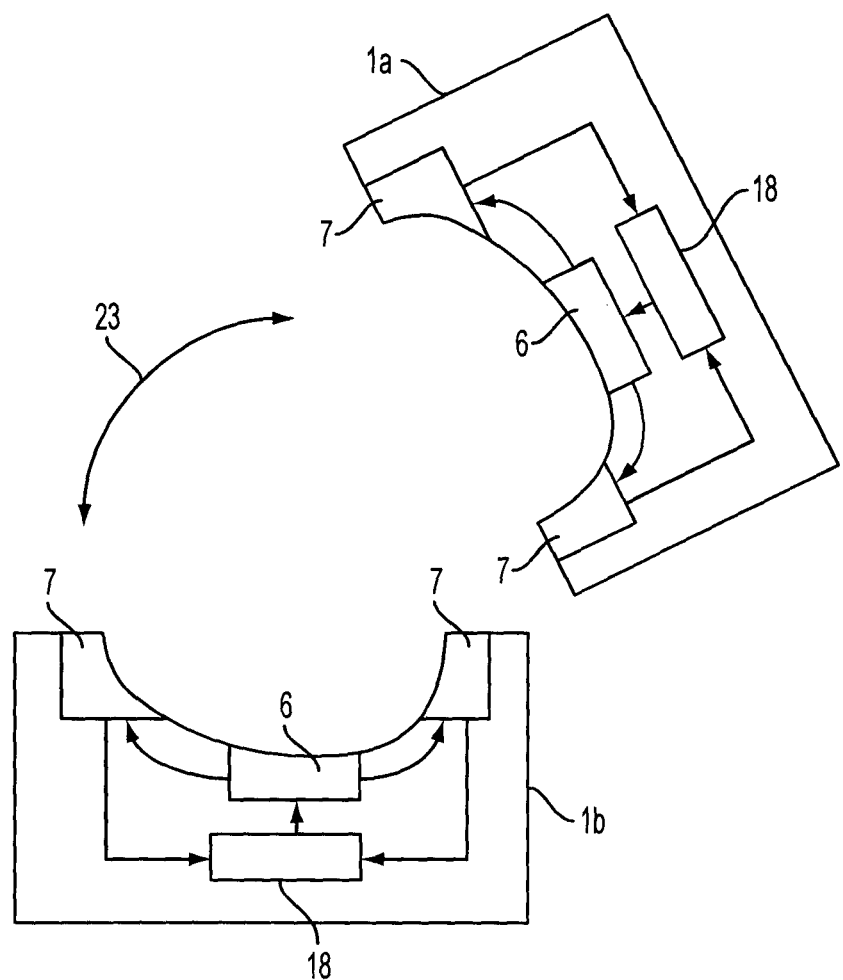
FIG. 5 is a schematic lateral cross-sectional illustration of the two halves of the moulding apparatus for a wind turbine blade in accordance with either of the first or second embodiments, held in respective support frames.

FIG. 5 illustrates the two half-moulds 1a, 1b in which the pivoting of the upper half-mould 1a is indicated by arrow 23. This arrangement may be used in both of the embodiments described above. In the arrangement shown in the drawing, separate heat exchangers 18 are provided in the two half-moulds 1a, 1b. In an alternative embodiment, some or all of the heat exchangers 18 may be used to control the temperature of the pressurised air flowing in both of the half-moulds 1a, 1b. In this case flexible conduits 13, 16 may be used to connect the heat exchangers 18 to the supply and exhaust ports to accommodate the relative movement as the mould 1 is closed.

Figure 6:
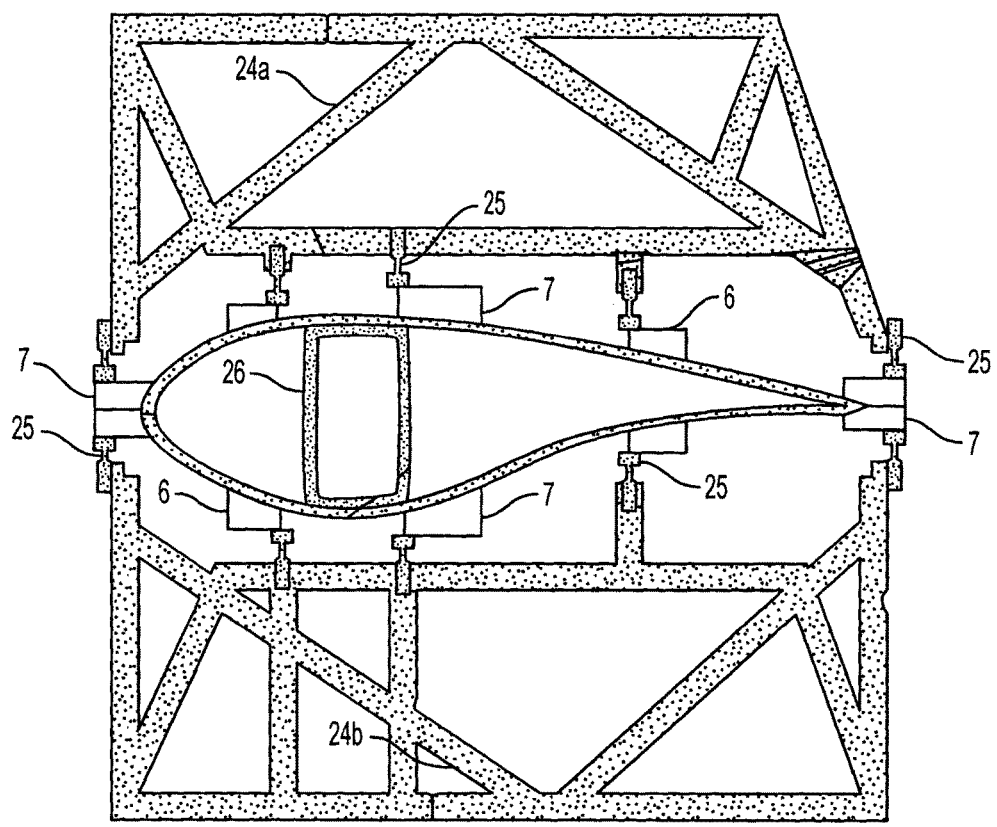
FIG. 6 is a schematic lateral cross-sectional illustration of the two halves of the moulding apparatus, in accordance with the second embodiment, shown in the closed configuration.

FIG. 6 illustrates the support structure for the two mould halves 1a, 1b of the second embodiment. The upper mould half 1a is supported on an upper structure 24a, and the lower half-mould 1b on a corresponding lower structure 24b. The structures 24a, 24b additionally support the supply chambers 6, the exhaust chambers 7, the conduits 13, 16 and the heat exchangers 18 (not shown). The mould 1 is attached to the support structure 24a, 24b by a number of interface brackets 25 which connect the respective supply and exhaust chambers 6, 7 to the support structure. As shown in the drawing, an internal spar 26 is placed within the shell after the shell has been moulded and prior to the removal of the mould. The spar 26 serves to strengthen the turbine blade.

In the embodiments described above, the pressurised air is caused to flow within the mould 1 in a direction generally transverse to the longitudinal direction of the mould 1. However, other configurations are possible. FIG. 7(a) illustrates the arrangements described above, in which the air flow is in the lateral or widthwise direction within the mould 1, as indicated by the arrows 27. However, FIG. 7(b)

illustrates an alternative arrangement in which the air flow is generally in the longitudinal direction of the mould 1, as indicated by the arrows 28.

Referring to FIG. 8, a method of moulding a wind turbine blade in accordance with a preferred embodiment of the present invention is summarised by the following steps.

Moulding apparatus, in the form of two mould halves as described above, including supply chambers, exhaust chambers, conduits and heat exchangers, are provided at step 29. The mats used to form the turbine blade shell are placed into the respective mould-halves at step 30, and heated pressurised air is supplied to the mould at step 31 and exhausted from the mould at step 32 using heat supplied from a heat exchanger. After the epoxy resin in the turbine blade shell is cured, the water supply for the heat exchangers is then replenished with cold water at step 33. The resulting cold air is then supplied to the mould at step 34 and exhausted from the mould at step 35, and heat is removed from the air by the heat exchanger so as to cool the turbine blade shell. The article is then removed from the mould at step 36, and the method then returns to step 30 where a fresh mat is placed in the mould.

It will be apparent that numerous variations or modification to the preferred embodiments may be made without departing from the scope of the present invention which is defined solely by the claims.

The invention claimed is:

1. An apparatus for moulding an article, the apparatus comprising:
    a mould having a structure which permits a flow of gas therethrough, the apparatus being arranged to supply gas to the mould at a plurality of supply ports and to cause the gas to flow through the mould so as to control the temperature of the article in the mould, and to be exhausted from the mould at a plurality of exhaust ports; and
    a plurality of heat exchangers located externally to the mould, each heat exchanger being arranged to transfer heat between the gas flowing from at least one of the exhaust ports to at least one of the supply ports and a supply of liquid;
    wherein the apparatus is arranged such that the supply liquid flows to the plurality of heat exchangers without flowing through the mould to control the temperature of the article in the mould.

2. The apparatus as claimed in claim 1, further comprising:
    at least one supply chamber for supplying gas to a first region of the surface of the mould and defining the plurality of supply ports; and
    at least one exhaust chamber for exhausting gas from second, different region of surface of the mould and defining the plurality of exhaust ports.

3. The apparatus as claimed in claim 1, further comprising:
    a plurality of supply conduits external to the mould, each connected between a respective supply port and the associate heat exchanger; and
    a plurality of exhaust conduits external to the mould, each connected between a respective exhaust port and the associated heat exchanger.

4. The apparatus as claimed in claim 3, wherein the mould is elongate, and the at least one supply chamber and the at least one exhaust chamber extend along substantially the full length of the mould, the apparatus further comprising:
    at least one additional elongate supply chamber for supplying gas to a third, different region of the surface of the mould which extends along only part of the length of the mould, the or each additional supply chamber defining a plurality of additional supply ports; and
    at least one additional elongate exhaust chamber for exhausting gas from a fourth, different region of the surface of the mould which extends along only part of the length of the mould, the or each additional exhaust chamber defining a plurality of additional exhaust ports.

5. The apparatus as claimed in claim 4, further comprising:
    a plurality of additional supply conduits external to the mould, each connected between a respective additional supply port and a heat exchanger; and
    a plurality of additional exhaust conduits external to the mould, each connected between a respective additional exhaust port and a heat exchanger.

6. The apparatus as claimed in claim 4, wherein the heat exchangers are distributed longitudinally along the apparatus.

7. The apparatus as claimed in claim 4, wherein the mould is of a generally tapered configuration, extending from a relatively large end to a relatively small end, and in which the or each additional supply chamber and the or each additional exhaust chamber extend along the part of the length of the mould from the relatively large end.

8. The apparatus as claimed in claim 1, further comprising a structure for supporting the mould, the at least one supply chamber, the at least one exhaust chamber, the conduits and the heat exchangers.

9. The apparatus as claimed in claim 8, wherein the mould is formed in first and second parts, each of which is shaped to form a respective half of the article.

10. The apparatus as claimed in claim 9, wherein gas exhausted from the first part of the mould is supplied to the second part of the mould, at least one of the heat exchangers being arranged to transfer heat between the gas flowing from the first part of the mould to the second part of the mould and a supply of liquid.

11. The apparatus as claimed in claim 1, further comprising at least one additional, electric heat exchanger for providing additional control of the temperature of the gas.

12. A method of moulding an article, the method comprising:
    providing a mould having a structure which permits the flow of gas therethrough;
    placing the article in the mould;
    causing gas to flow through the mould so as to control the temperature of the article in the mould;
    supplying the gas to the mould at a plurality of supply ports;
    exhausting the gas from the mould at a plurality of exhaust ports; providing a plurality of heat exchangers external to the mould, and using each heat exchanger to transfer heat between the gas flowing from at least one of the exhaust ports to at least one of the supply ports and a supply of liquid, wherein the supply of liquid flows to the plurality of heat exchangers without flowing through the mould to control the temperature of the article in the mould.

13. The method as claimed in claim 12, wherein the article is sequentially heated and cooled, and wherein the same supply of liquid is used during the cooling of the article and the subsequent heating of a further article in the same mould.

14. The method as claimed in claim 12, comprising heating the article in the mould using heat supplied from the at least one heat exchanger and subsequently cooling the article using gas which is supplied to the mould without passing through a heat exchanger.

15. The method as claimed in claim 12, wherein the gas comprises air.

16. The method as claimed in claim 12, wherein the liquid comprises water.

17. The method as claimed in claim 12, wherein the liquid comprises oil.

18. The method as claimed in claim 12, wherein the article comprises at least part of a blade for a wind turbine.

19. The method as claimed in claim 18, wherein the article comprises an outer shell for a wind turbine blade.

20. The apparatus as claimed in claim 1, wherein the apparatus is arranged such that the supply liquid supplies heat to the gas in the heat exchanger in a first mode of operation, and removes heat from the gas in the heat exchanger in a second mode of operation.

* * * * *